United States Patent
Perrault et al.

(10) Patent No.: US 10,118,456 B2
(45) Date of Patent: Nov. 6, 2018

(54) LOAD LEVELING EMULSION SUSPENSION SYSTEM

(71) Applicants: David Perrault, Bonsall, CA (US); Ivan Davis, Fallbrook, CA (US)

(72) Inventors: David Perrault, Bonsall, CA (US); Ivan Davis, Fallbrook, CA (US)

(*) Notice: Subject to any disclaimer, the term of this patent is extended or adjusted under 35 U.S.C. 154(b) by 1 day.

(21) Appl. No.: 15/402,056

(22) Filed: Jan. 9, 2017

(65) Prior Publication Data

US 2017/0368901 A1  Dec. 28, 2017

Related U.S. Application Data

(60) Provisional application No. 62/277,160, filed on Jan. 11, 2016.

(51) Int. Cl.
| | |
|---|---|
| *B60G 17/048* | (2006.01) |
| *B60G 11/26* | (2006.01) |
| *B60G 3/14* | (2006.01) |
| *B60G 11/27* | (2006.01) |
| *B60G 11/30* | (2006.01) |
| *B60G 17/015* | (2006.01) |
| *B60G 17/04* | (2006.01) |

(52) U.S. Cl.
CPC .............. *B60G 17/048* (2013.01); *B60G 3/14* (2013.01); *B60G 11/265* (2013.01); *B60G 11/27* (2013.01); *B60G 11/30* (2013.01); *B60G 17/0152* (2013.01); *B60G 17/0416* (2013.01); *B60G 2200/132* (2013.01); *B60G 2202/154* (2013.01); *B60G 2202/413* (2013.01); *B60G 2206/422* (2013.01); *B60G 2500/30* (2013.01); *B60G 2800/914* (2013.01)

(58) Field of Classification Search
CPC ... B64C 25/60; F16F 9/06; F16F 9/065; F16F 9/342; F16F 9/348; F16F 9/467; B60G 11/265; B60G 2800/914; B60G 17/08; B60G 17/048
USPC .... 267/64.13, 64.26, 64.25, 64.28, 217–218; 188/322.21, 269
See application file for complete search history.

(56) References Cited

U.S. PATENT DOCUMENTS

| | | | |
|---|---|---|---|
| 3,466,055 A | 9/1969 | Keijzer | |
| 3,582,106 A | 6/1971 | Keijzer | |
| 4,226,408 A | 10/1980 | Tomita et al. | |
| 5,042,253 A * | 8/1991 | Kataoka | F15B 11/076 60/560 |
| 5,956,951 A * | 9/1999 | O'Callaghan | B60G 17/08 188/267.1 |
| 5,988,607 A | 11/1999 | Beck | |
| 6,217,010 B1 | 4/2001 | McNeely | |
| 6,418,363 B2 | 7/2002 | Cochofel et al. | |

(Continued)

FOREIGN PATENT DOCUMENTS

FR          3010757 A1 *  3/2015

*Primary Examiner* — Robert A. Siconolfi
*Assistant Examiner* — San M Aung
(74) *Attorney, Agent, or Firm* — MacMillan, Sobanski & Todd, LLC

(57) ABSTRACT

A suspension system is disclosed utilizing oil addition and subtraction to actuate an accumulator to control position and stiffness in an Emulsion Shock/Oleo Pneumatic strut/Air spring strut. The strut maintains ride height for a wide variation in sprung mass and adjusts for the expansion/compression of the gas due to variations in temperature. The strut provides spring and damping characteristics.

4 Claims, 8 Drawing Sheets

(56) References Cited

U.S. PATENT DOCUMENTS

| | | | |
|---|---|---|---|
| 7,740,256 B2 | 6/2010 | Davis | |
| 2002/0179389 A1* | 12/2002 | Sawai | B60G 17/0408 |
| | | | 188/322.18 |
| 2006/0124414 A1* | 6/2006 | Hanawa | B62K 25/08 |
| | | | 188/314 |
| 2008/0018035 A1* | 1/2008 | Porter | B60G 17/08 |
| | | | 267/218 |
| 2009/0127812 A1* | 5/2009 | Copsey | B60G 9/02 |
| | | | 280/124.128 |
| 2011/0147148 A1* | 6/2011 | Ripa | F16F 9/44 |
| | | | 188/322.13 |
| 2013/0032979 A1* | 2/2013 | Ripa | B62K 25/04 |
| | | | 267/64.26 |

* cited by examiner

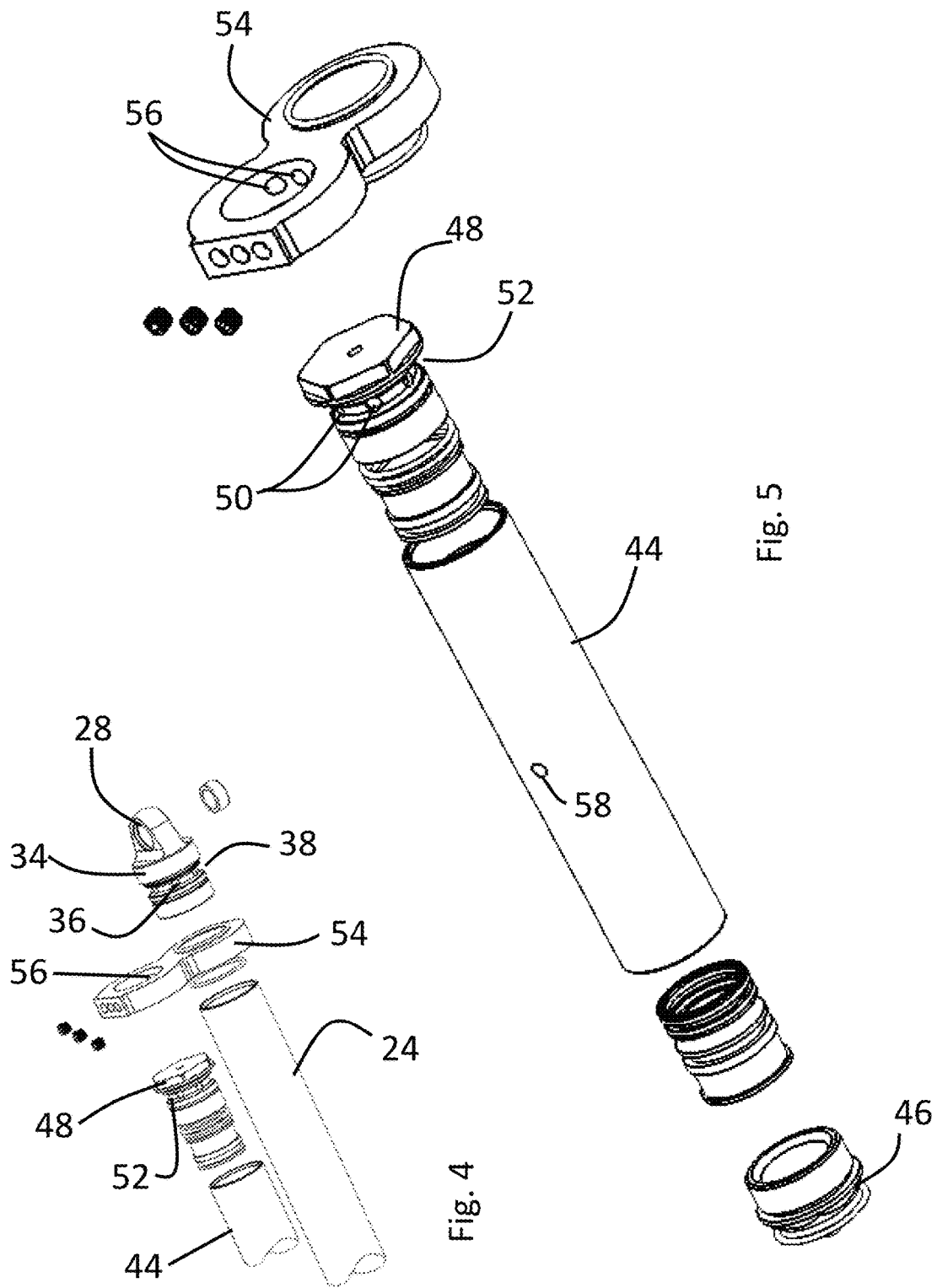

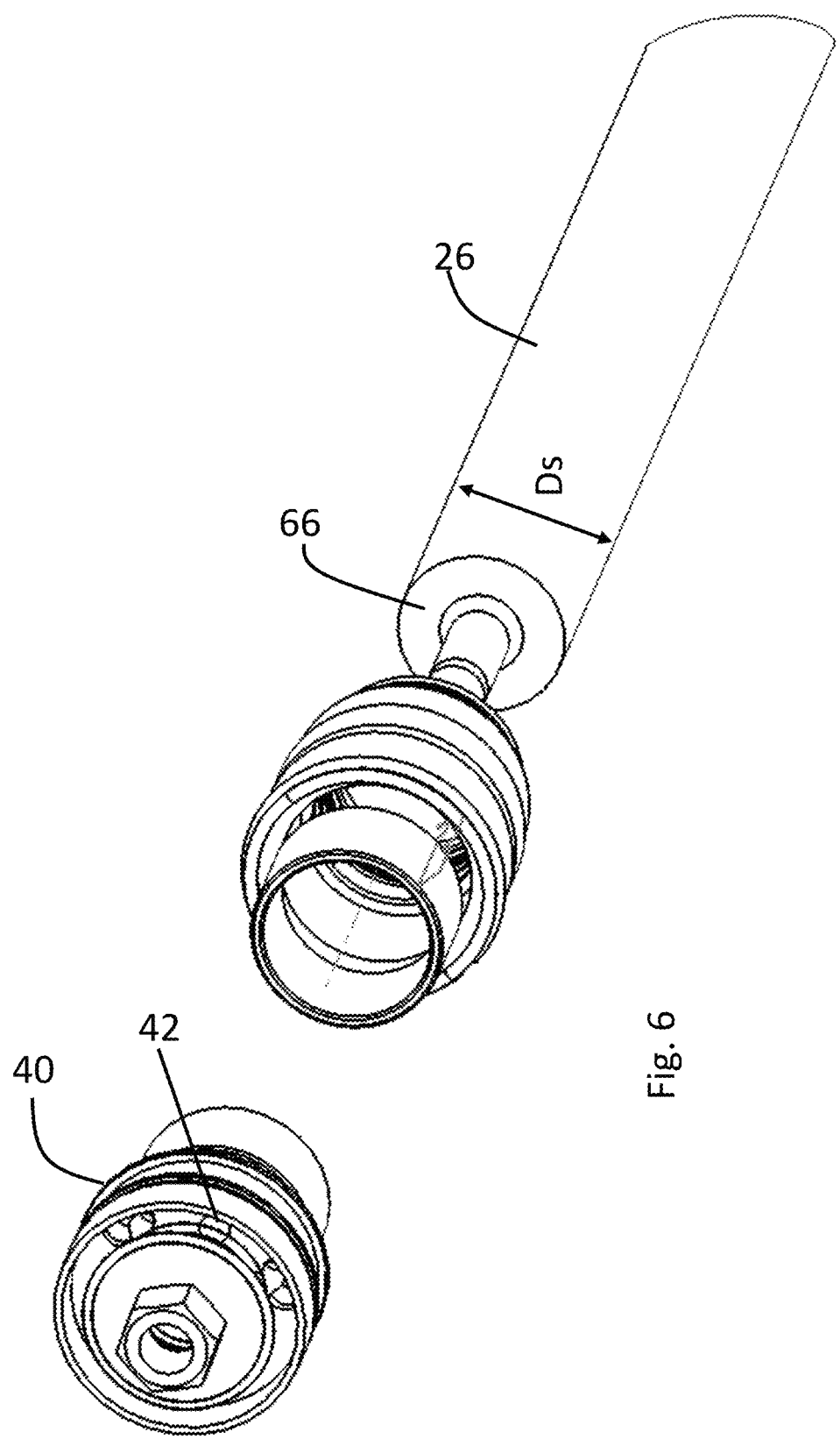

LOAD LEVELING EMULSION SUSPENSION SYSTEM

CROSS-REFERENCE TO RELATED APPLICATIONS

This application claims the benefit of U.S. Provisional Application No. 62/277,160, filed Jan. 11, 2016, the disclosure of which is incorporated herein by reference.

BACKGROUND OF THE INVENTION

This invention relates in general to load leveling suspensions. In particular, this invention relates to a fluid sprung, load leveling strut having a compensation unit that can adjust for factors affecting vehicle ride height.

Load leveling suspensions are known that compensate for vehicle ride height by providing for the addition of fluid, such as oil or air, to directly extend an inner strut member relative to an outer strut member. The compensating fluid may be added manually or in response to a sensed unlevel condition. Some leveling suspensions rely on conventional coil or leaf springs to support the majority of vehicle weight and utilize a load leveling component for additional load compensation. Certain types of leveling suspensions, such as disclosed in U.S. Pat. No. 3,582,106 to Keijzer, utilize a pumped hydraulic oil as the compensation fluid to extend the inner and outer members. This design provides a separate pneumatic bladder chamber that compresses or expands in response to the increased sprung load and suspension articulations.

Current load leveling suspensions, however, are not tunable over a wide range of vehicle types or operating conditions. Thus, it would be desirable to provide a load leveling strut that can be tuned for different vehicles or changing load conditions.

SUMMARY OF THE INVENTION

This invention relates to a fluid sprung, load leveling strut having a compensation unit that can adjust for factors affecting vehicle ride height.

A load leveling strut comprises a main strut body and a compensation unit. The main strut body includes a strut rod telescopically received within a sleeve. The strut rod and sleeve define a volume that contains a first compressible fluid. The compensation unit defines first, second, and third fluid chambers. The first chamber is in fluid communication with the volume defined by the strut rod and sleeve. The first chamber contains the first compressible fluid retained by a first piston. The second chamber has a stop ring that defines a second chamber volume and is configured to accept a volume of an incompressible fluid. The stop ring limits movement of the first piston in one direction. The third chamber has a second piston and a closed end defining a third chamber volume that contains a second compressible fluid. The second chamber alters a vehicle ride height in response to the volume of the incompressible fluid in the second chamber.

Various aspects of this invention will become apparent to those skilled in the art from the following detailed description of the preferred embodiment, when read in light of the accompanying drawings.

BRIEF DESCRIPTION OF THE DRAWINGS

FIG. 4 is an exploded view of the upper portion of the load leveling strut of FIG. 3.

FIG. 5 is an enlarged exploded view of a compensation unit of the load leveling strut of FIG. 3.

FIG. 6 is an exploded, perspective view of a piston/shaft and damper assembly of the load leveling strut of FIG. 2B.

DETAILED DESCRIPTION OF THE PREFERRED EMBODIMENT

Figure 1:
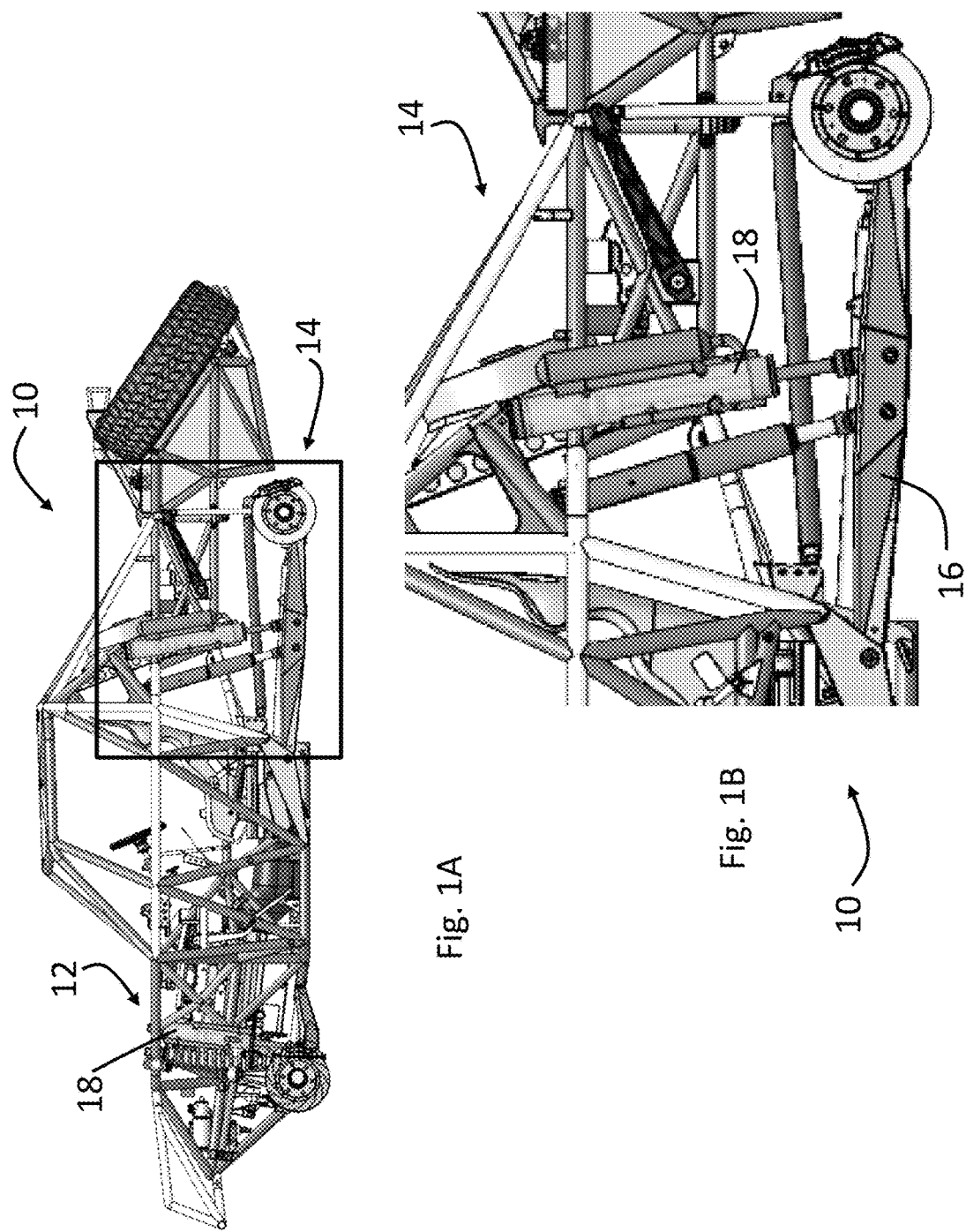
FIG. 1A is an elevational view of an exemplary vehicle having a load leveling strut in accordance with the invention.
FIG. 1B is a close up view of the load leveling strut of FIG. 1A.

Referring now to the drawings, there is illustrated in FIG. 1A a vehicle, shown generally at 10, having a front suspension 12 and a rear suspension 14. The rear suspension 14 is shown in an enlarged view of FIG. 1B and includes a trailing arm 16 that is pivotally connected to the vehicle 10. The trailing arm 16 including drive axles or wheel hubs and halfshaft assemblies generally illustrate rear unsprung mass of the vehicle. A similar condition exists at the front suspension 12. The unsprung mass generally is weight that is not supported by the suspension. The remainder of the vehicle 10 that is supported by the suspension is considered sprung mass. Though illustrated as an independent rear suspension, a conventional solid axle suspension is also within the scope of the invention. Additionally, the invention is equally applicable to the front suspension 12. The rear suspension 14 includes a load leveling strut 18 connected between the trailing arm 16 and a portion of the vehicle 10, such as a frame, body, space-frame, or other position representing the sprung mass.

Figure 2:
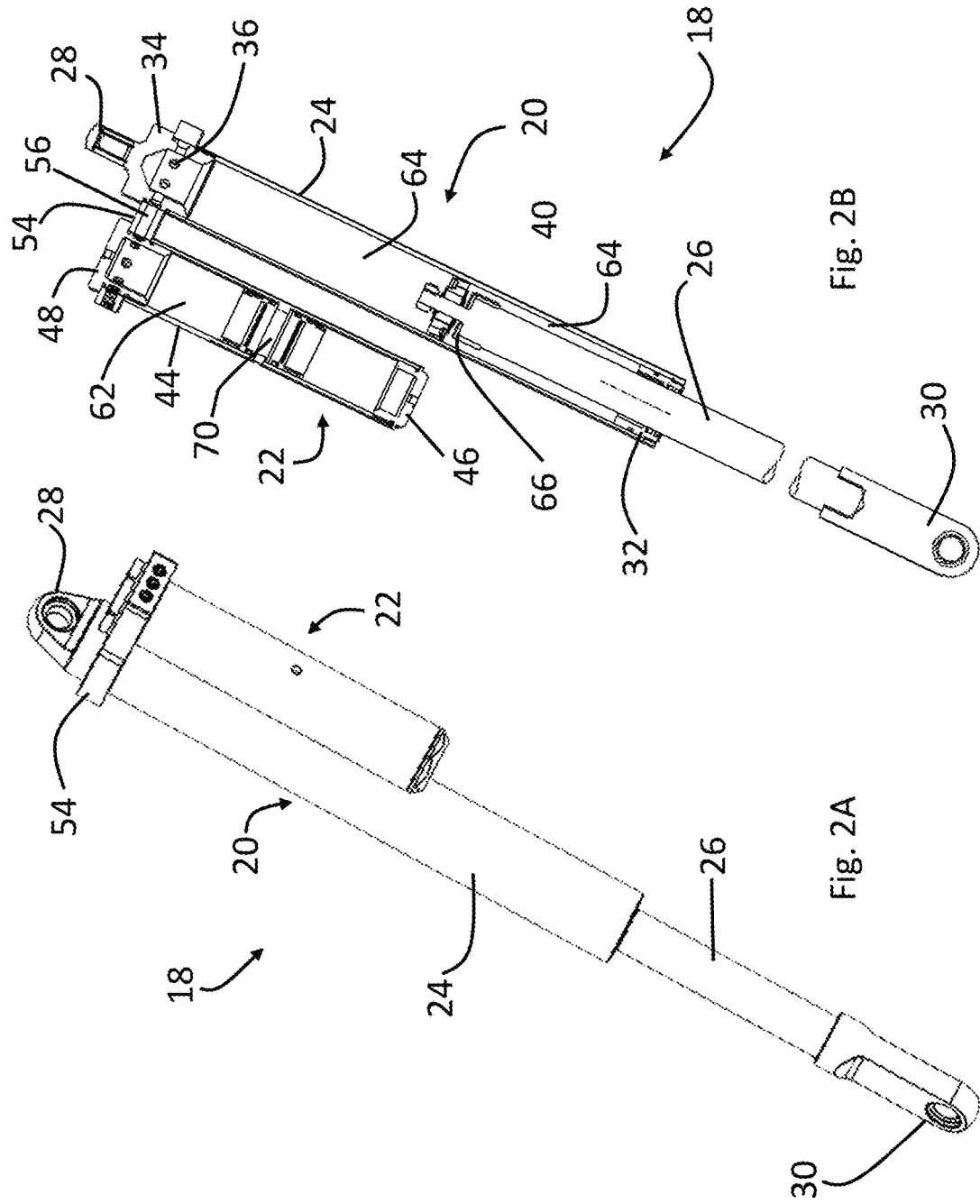
FIG. 2A is a perspective view of an embodiment of a load leveling strut.
FIG. 2B is a perspective view, in cross section, of the load leveling strut of FIG. 2A.
Figure 3:
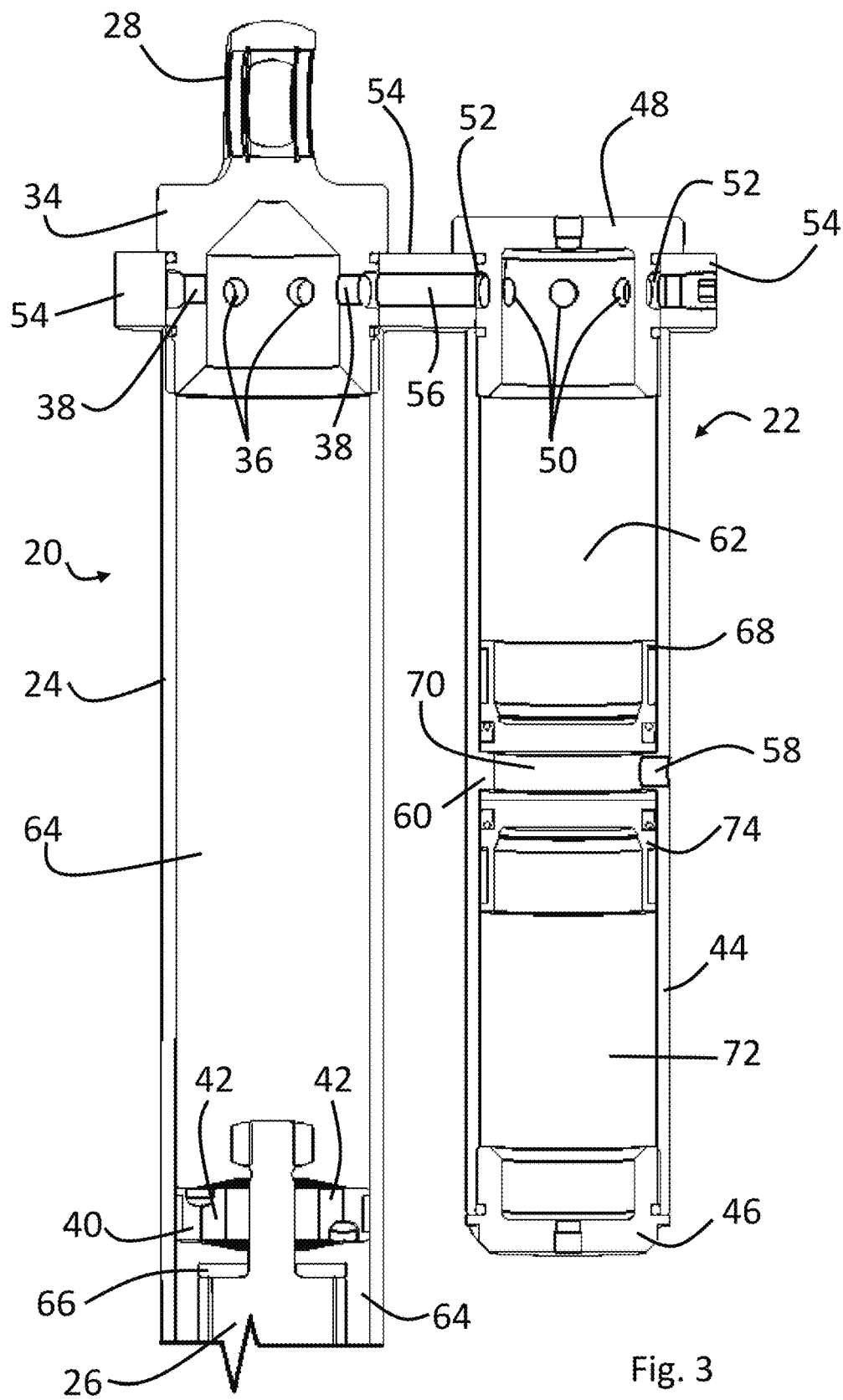
FIG. 3 is an enlarged, sectional view of an upper portion of the load leveling strut of FIG. 2B.

Referring now to FIGS. 2A, 2B and 3, the load leveling strut 18 includes a main strut body 20 and a compensation unit 22. The main strut body 22 includes a sleeve 24 and a strut rod 26 that is telescopically received within the sleeve 24. The sleeve includes a first mounting point 28 and the strut rod 26 includes a second mounting point 30 that permit a pivotal attachment of the strut 18 between the sprung and unsprung masses. The sleeve 24 includes a seal and bushing assembly 32 that seals against a portion of the diameter of the strut rod 26 and permits movement of the strut rod 26 within the sleeve 24. A fluid diffuser 34 seals the opposite end of the sleeve 24 from the seal and bushing assembly 32 and is attached to the first mounting point 28. The fluid diffuser 34 includes a plurality of fluid ports 36 in fluid communication with a channel 38 that permit fluid flow between the sleeve 24 and the compensation unit 22. The strut rod 26 terminates in a damping plunger 40. The damping plunger 40 includes a plurality of fluid damping ports or orifices 42 that permit fluid to flow through as the strut rod 26 moves within the sleeve 24. The damping ports 42 provide a fluid shearing effect to create an appropriate damping force.

The compensation unit 22 includes a cylindrical outer body 44 terminating in a sealed end 46 on one end and a compensation diffuser 48 on the other end. The compensation diffuser 48 includes a plurality of fluid ports 50 connected together by a fluid channel 52, similar to the fluid diffuser 34. The compensation diffuser 48 and the fluid diffuser 34 are coupled for fluid communication therebetween by a bridge 54. The bridge 54 includes one or more fluid channels 56 in communication with the channels 38 and 52 and also the plurality of fluid ports 36 and 50. The compensation unit 22 includes an oil inlet port 58 extending through a stop ring 60. The stop ring 60 divides the interior of the compensation unit 22 into three chambers. While the load leveling strut 18 is illustrated as having a separate accumulator arrangement the design is not limited to a separate reservoir/accumulator. This system can be configured into a single strut housing.

A first chamber defines a spring chamber 62 that provides a load resistance as a function of the volume of a compressible fluid, such as a compressed gas or a mixture of gas and oil. In one embodiment, the spring chamber 62 is filled with a mixture of Nitrogen gas and oil to form an emulsion. In another embodiment, the spring chamber 62 may be filled with a gas, such as air, Nitrogen, an inert gas or other compressible fluid medium to form an Air Spring strut. These suspensions do not require a mechanical spring, such as coil or leaf springs commonly found in most wheeled vehicle applications. The spring chamber 62 is in fluid communication with the interior of the sleeve 24, defining a strut spring chamber 64. The chambers 62 and 64 are charged to a specific pressure and oil level to provide a "spring force" for a desired stiffness and ride characteristics.

The strut rod 26, as shown in FIG. 6, terminates in a piston end 66 (which includes the area connecting the damper plunger 40 to the rod) having a diameter, D that provides a force differential between the mounting points 28 and 30. The force differential is adequate to provide the "spring" force to suspend the vehicle. The spring chamber 62 of the compensation unit 22 terminates in a spring chamber piston 68. The piston 68 and the strut rod piston end 66 define the variable volume of the spring chambers 62 and 64 that reacts against the applied load to support the vehicle weight. To change the amount of "spring" progression, the compressible fluid is added or subtracted to the chambers 62 and 64 during initial set up. To change the amount of spring force, the gas component of the compressible fluid is increased or decreased appropriately. Damping in the strut is done by the oil/nitrogen mixture traveling through the orifices 42 of the damping plunger 40. Alternatively, damping can be accomplished through other orifices, such as the fluid ports 36 and 50, and/or bridge channels 56.

A second chamber defines a load leveling chamber 70. The piston 68, which is moveable within the spring chamber 62 separates the first and second chambers 62 and 70. Oil, or another generally incompressible fluid, may be introduced or withdrawn from the load leveling chamber 70, in response to a sensed out of level condition of the vehicle or a force or pressure differential in the strut 18. When no oil is in the load leveling chamber 70, the piston 68 rests against one portion of the stop ring 60. In this condition, the strut 18 reacts in a generally conventional manner, similar to other types of fluid or air spring struts. When the strut rod 26 is compressed due to an increased load, oil is added to the load leveling chamber 70. This additional oil causes the piston 68 to travel towards the compensation diffuser 48, compressing the volume within the chambers 62 and 64, thus increasing the pressure therein. When the internal pressure increases, more spring force is created, bringing the suspended vehicle back to the desired ride height.

A third chamber of the compensation unit 22 is a ride characteristic chamber 72. The ride characteristic chamber 72 is charged with a compressible fluid, such as Nitrogen, though any suitable gas, such as another inert gas, may be used. The ride characteristic chamber 72 is defined by the sealed end 46 on one side and a second piston 74, located against the stop ring 60, in a static, unloaded or empty condition. When the strut 18 is subjected to a loaded state, oil in the load leveling chamber 70 provides a hydraulic link between the spring chamber 62, 64 and the ride characteristic chamber 72. By varying the amount of pressure in the ride characteristic chamber 72, a tunable ride characteristic and spring rate progression during the loaded state can be achieved. In one embodiment, the pressure in the ride characteristic chamber 72 is a fixed pre-charged pressure. In an alternative embodiment, the pressure in the ride characteristic chamber 72 may be varied during operation. Adjusting the pressure in ride characteristic chamber 72 changes or tunes the spring progression throughout the various positions of the strut rod 26. The size and pressure of ride characteristic chamber 72 is another factor that affects the spring characteristics in the strut 18, particularly during a loaded state.

During operation, as the strut 18 is loaded, the emulsion fluid in chambers 62, 64 compresses due to the Nitrogen content and the distance between the mounting points 28 and 30 decreases. The ratio of Nitrogen gas to oil is one tunable parameter that may be adjusted in conjunction with the volume defined by the sleeve interior bore dimension and the strut diameter D. The sleeve and strut sizes are typically determined by the structural and fatigue considerations of the system and the available design envelope. Compression of the fluid causes the ride height to be reduced proportionally to the weight. As the volume of Nitrogen is increased in the emulsion fluid, the stiffness curve becomes shallower. As the volume of Nitrogen is decreased, the stiffness curve becomes steeper. The ride characteristic chamber 72 is charged to provide a desired, secondary reaction spring rate responding to oil added to the load leveling chamber 70. To raise the ride height, oil is added (by way of a pump or other oil pressure source) to the load leveling chamber 70. Conversely, oil may be removed back to a reservoir to lower the ride height. The piston 68 compresses the emulsion fluid in chambers 62, 64 causing an increase in pressure in the chamber and the strut 26 to extend, thus raising the vehicle. The piston 74 deflects proportionally based on the Nitrogen pressure in ride characteristic chamber 72.

Figure 9:
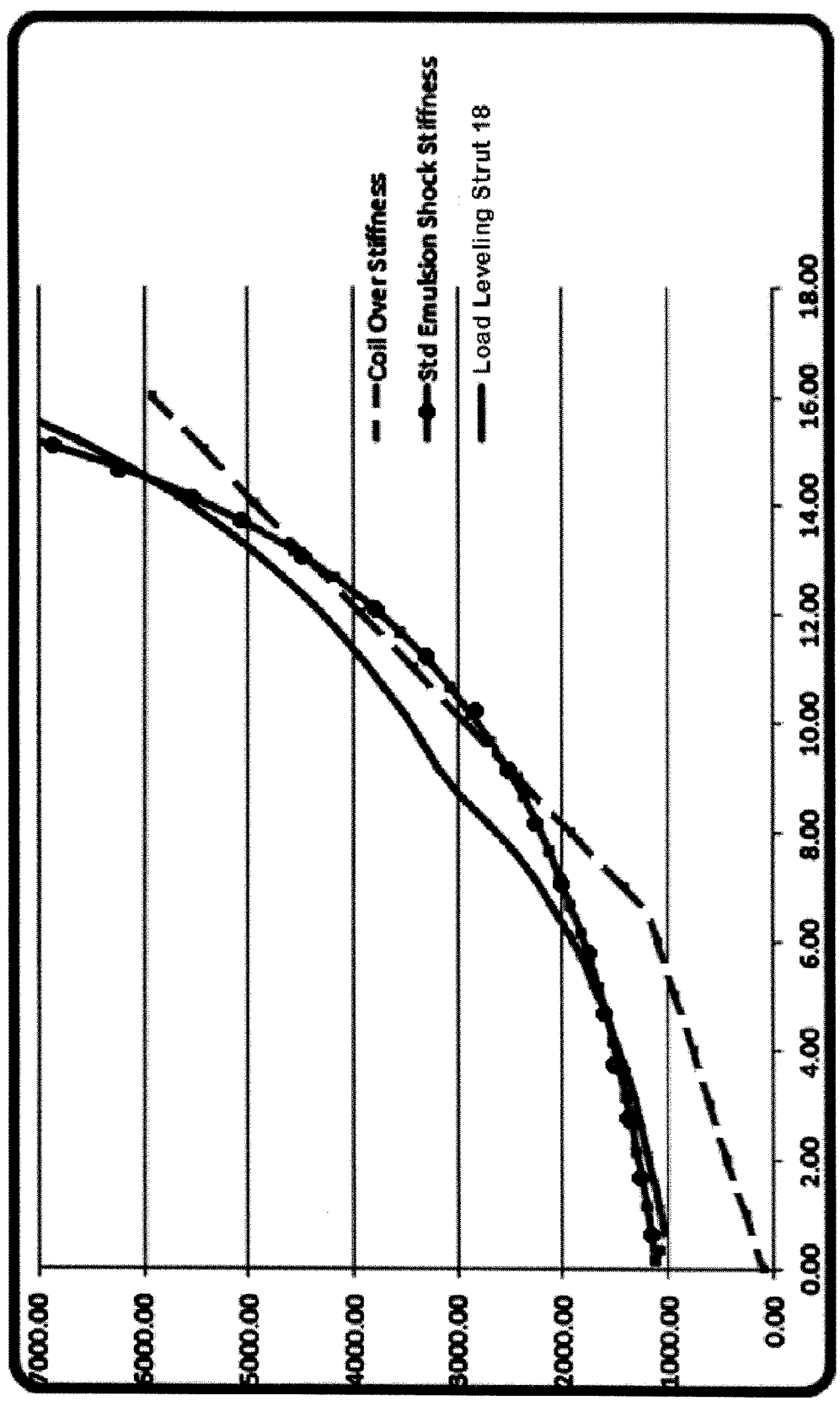
FIG. 9 is a comparative plot of stiffness over a deflection range another embodiment of an Emulsion shock and the Dual Spring rate Coil.

As the vehicle suspension articulates in response to the terrain, the strut rod 26 compresses the emulsion fluid. Typically, the ride characteristic chamber 72 is pressurized to a level that adjusts the movement of the strut 18 in the upper load range. For example, as shown in FIG. 9, a "knee" or change in slope occurs at approximately 9 inches of deflection and 3000 lbs. of force. This knee represents the initiation point of the influence of the ride characteristic chamber response to overall strut performance. Thus, by varying the Nitrogen charge pressure in conjunction with the gas/oil ratio of the emulsion fluid, the response of the strut 18 may be tailored to different response over the load/deflection curve.

In another embodiment of a strut system using a plurality of load leveling struts 18, two struts 18 may be fluidly interconnected by the oil inlet ports 58. In addition, an oil pump may be coupled to the interconnected struts to supply leveling oil for one or both struts 18. In applications involving a solid axle, for example, the interconnected struts 18 have the advantage that a compressed strut may be able to supply oil from the compressed strut load leveling chamber 70 to an extended strut load leveling chamber 70. This condition may result in a beneficial balancing of forces when a vehicle traverses a ditch or other undulation that compresses one strut but permit extension of the other strut across the same axle.

Figure 7:
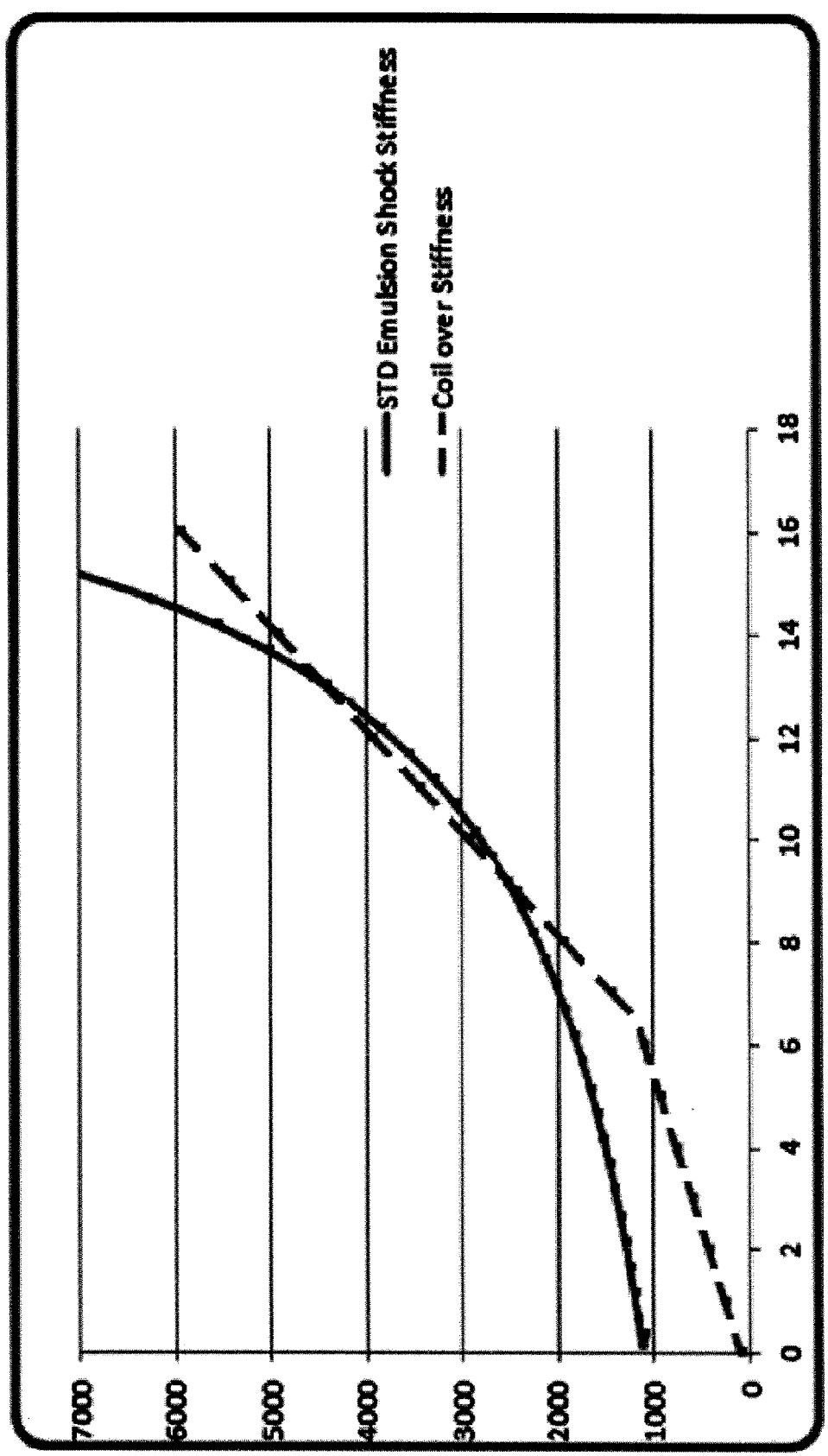
FIG. 7 is a comparative plot of stiffness over a deflection range of a first embodiment of an Emulsion Shock and a Dual Spring rate Coil-over shock assembly.

Referring now to FIG. 7, there is a comparative plot of stiffness of a stiffness for a standard strut having an emulsion-based support fluid ("Emulsion Shock") versus a Dual Spring rate Coil-over strut assembly, showing load (Lbs.) over a deflection range (inches). As shown in FIG. 7, the stiffness of the Emulsion Shock can be adjusted to simulate a conventional coil-over shock arrangement. As can be seen from the plot of the Emulsion Shock, there is an increase in stiffness toward the end of travel. In addition, the Emulsion Shock stiffness curve is characteristic of a second or higher degree polynomial, rather than the linear segments of the dual rate coil-over shock. This increased stiffness is beneficial when the vehicle is in a loaded condition.

Figure 8:
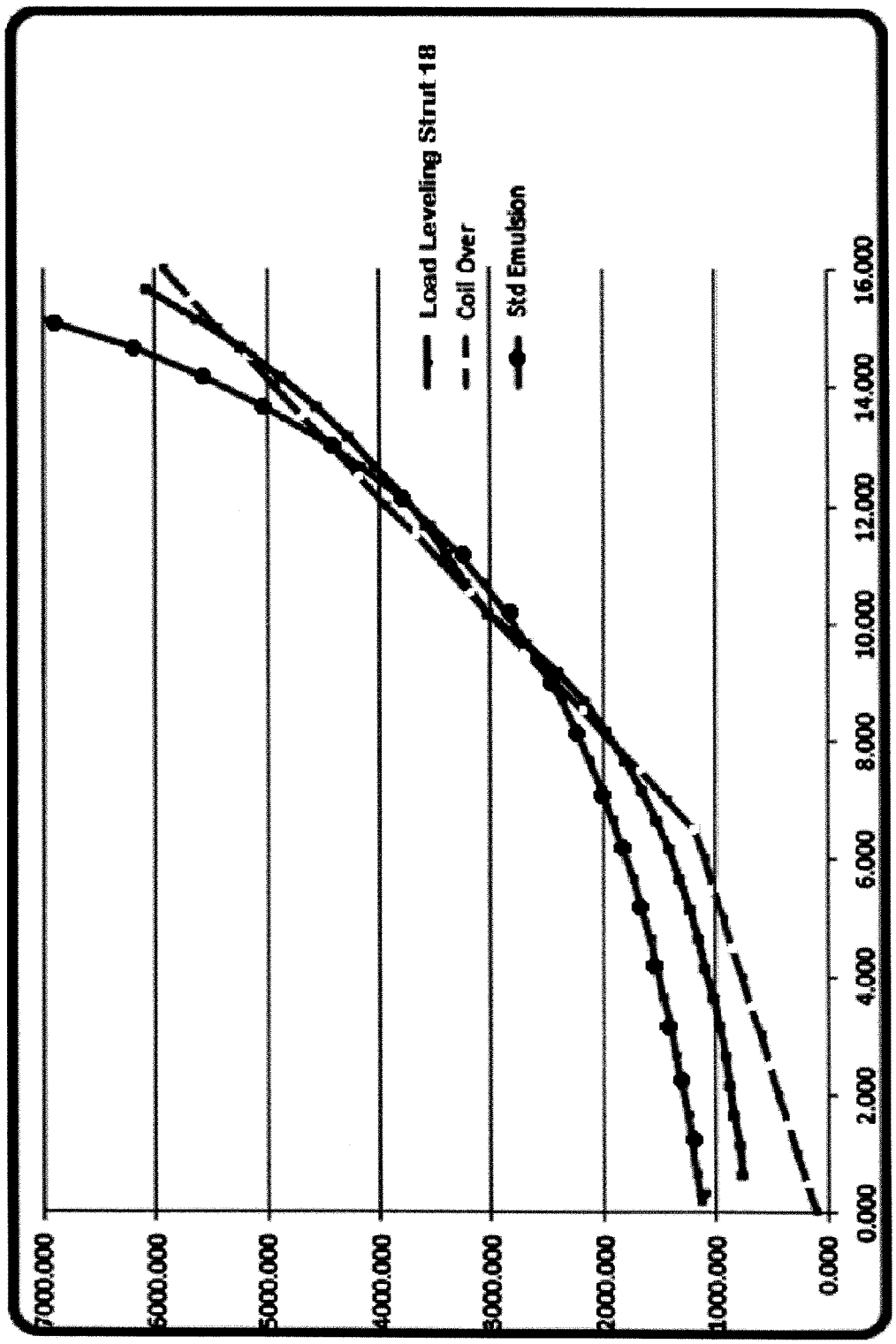
FIG. 8 is a comparative plot of stiffness over a deflection range for the first embodiment Emulsion Shock, the Dual Spring Rate Coil-over shock and a second embodiment of an Emulsion shock.

Referring now to FIG. 8, there is illustrated a comparative plot of stiffness over a deflection range for the Emulsion Shock, the Dual Spring Rate Coil-over shocks and the load leveling strut 18 having the compensation unit 22. The compensation unit 22 of the load leveling strut 18 permits the ability to tune the response characteristics of the strut 18. Depending on adjustment of the tuning parameters, the response of the strut can simulate the stiffness characteristics of the dual rate coil-over shock, the Emulsion Shock, a combination of both curves or other response functions of load and deflection. The plot for the load leveling strut 18 of FIG. 8 represents the compensation unit 22 having the load leveling function detuned throughout the stroke range of the strut rod 26. In the detuned state, the load leveling chamber 70 is discharged of oil. Thus, the load leveling strut 18 is configured to respond similarly to the Emulsion Shock.

Referring now to FIG. 9, a comparative graph, similar to FIG. 8, shows the stiffness of the load leveling strut 18 with the compensation unit 22 operating with an oil charge to provide a load leveling function. FIG. 9 compares the effectiveness of the load leveling feature over the Emulsion Shock stiffness and the Dual Spring rate Coil against stiffness. By adding oil to the middle chamber in the accumulator, the stiffness plot is shifted. This provides increased stiffness in the middle of the travel to maintain ride height and increase the stiffness at the end of the travel for bottom out control. During testing, when a load was added to the vehicle, the coil-over shock compressed 2 inches. The coil-over shock was configured for a 500 lb/in spring rate. In order to maintain the original ride height, an additional 1000 lbs of stiffness is needed. With the addition of oil to the compensation unit 22, the deflection of the strut 18 is compensated for the additional weight and ride height, and the increased stiffness though out the travel helps control the increase in sprung mass.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A load leveling strut comprising:
   a main strut body having a strut rod telescopically received within a sleeve, the strut rod and sleeve defining a volume that contains a first compressible fluid; and
   a compensation unit defining:
   a first chamber in fluid communication with the volume defined by the strut rod and sleeve, the first chamber containing the first compressible fluid retained by a first piston,
   a second chamber having a stop ring that defines a second chamber volume, the stop ring limiting movement of the first piston in one direction, the second chamber configured to accept a volume of an incompressible fluid, and
   a third chamber having a second piston and a closed end defining a third chamber volume that contains a second compressible fluid;
   wherein the second chamber alters a vehicle ride height in response to the volume of the incompressible fluid in the second chamber.

2. The load leveling strut of claim 1 wherein the first compressible fluid is an oil and gas emulsion and the second compressible fluid is a gas, and the incompressible fluid is oil.

3. The load leveling strut of claim 1 wherein a bridge provides the fluid communication between the first chamber and the volume defined by the strut rod and sleeve.

4. The load leveling strut of claim 1 wherein the volume of compressible fluid introduced into the second chamber is varied based on at least one of a sensed condition indicating a vehicle level condition, a strut deflection amount, or a pressure in the first chamber.

* * * * *